United States Patent [19]

Kabacinski

[11] Patent Number: 4,692,822

[45] Date of Patent: Sep. 8, 1987

[54] MAGNETIC TAPE SCANNING UNIT AND METHOD OF ASSEMBLY THEREOF

[75] Inventor: Mariusz Kabacinski, Vienna, Austria

[73] Assignee: U.S. Philips Corporation, New York, N.Y.

[21] Appl. No.: 728,560

[22] Filed: Apr. 29, 1985

[30] Foreign Application Priority Data

Apr. 30, 1984 [AT] Austria .................................. 1434/84

[51] Int. Cl.$^4$ ........................ G11B 5/027; G11B 15/60
[52] U.S. Cl. ...................................... 360/84; 360/108; 360/130.24
[58] Field of Search ...................... 360/84, 85, 95, 107, 360/108, 130.22–130.24; 219/121 LC, 121 LD

[56] References Cited

U.S. PATENT DOCUMENTS

| 4,031,558 | 6/1977 | Kusaka | 360/130.24 |
| 4,392,168 | 7/1983 | Maruyama et al. | 360/130.24 |
| 4,509,084 | 4/1985 | Fujioka et al. | 360/84 |

Primary Examiner—A. J. Heinz
Assistant Examiner—David J. Severin
Attorney, Agent, or Firm—Thomas A. Briody; Jack Oisher; William J. Streeter

[57] ABSTRACT

A magnetic tape scanning unit comprising at least one stationary and one coaxial rotatable drum seciton (1, 2), and a rotary transformer (14) comprising two transformer discs (15, 16). One of the transformer discs (16) is mounted on rotatable drum section (2) by means of at least three sleeves (21) of weldable material which are open at one end and closed at the opposite end, the closed ends projecting from the drum section, the sleeves being mounted in angularly spaced axially parallel bores therein. Transformer disc (16) is provided with mounting elements having surfaces associated with the sleeves, and the closed ends of the sleeves (21) are welded to the corresponding mounting element surfaces. Assembly of a transformer disc on a drum section is achieved by supporting the drum section and the transformer disc in a jig in which the bottoms of the drum section sleeves are situated opposite and spaced from the associated transformer disc mounting elements. The bottoms of the sleeves are then welded to the mounting element surfaces by means of laser beams which are projected through the open ends of the sleeves.

5 Claims, 4 Drawing Figures

MAGNETIC TAPE SCANNING UNIT AND METHOD OF ASSEMBLY THEREOF

BACKGROUND OF THE INVENTION

1. Field of the Invention

The invention relates to a drum-shaped scanning unit for magnetic tape recording and/or reproducing apparatus, around whose circumferential surface the magnetic tape can be wrapped at a predetermined angle. Such a scanning unit comprises at least one stationary drum section, a rotatable drum section which is coaxial with the stationary drum section, and a two-part rotary transformer comprising two transformer discs which are made of a ferrite material and which carry at least one transformer winding, the discs being arranged coaxially on the rotatable drum section and on the facing stationary drum section, respectively, with their major disc surface spaced from each other. At least one of the two drum sections is formed with at least three angularly spaced axially parallel bores in each of which a supporting element for the relevant transformer disc, to which said element is connected, is mounted. Such a scanning unit is used in apparatuses for recording and-/or reproducing video signals, which are commercially available under the type number VR 2220.

2. Description of the Related Art

In such scanning units the manner in which the transformer discs are mounted onto the drum sections poses a special problem, because the spacing between the facing major disc surfaces of the two transformer discs should be very small, of the order of magnitude of 0.05 mm, in order to ensure an optimum signal-transfer efficiency. Moreover, care must be taken to avoid impermissible changes in the spacing between the two transformer discs as a result of varying operating conditions and aging. Tolerances also play an essential part, because the transformer discs are made of a ferrite material which, as is known, may exhibit comparatively large tolerances when formed into a component. Until now the transformer discs were mounted onto the drum sections by means of an adhesive, but this is a rather intricate method, which also gives rise to stability problems. For mounting a transformer disc on a drum section of the aforementioned known scanning unit the supporting elements are constructed as cylindrical pins which are cemented to the transformer disc with one of their ends and which are inserted into bores in the drum section with their free ends after which they are cemented inside the bores with their circumferential surfaces, which demands several cementing operations.

SUMMARY OF THE INVENTION

It is an object of the invention to provide a magnetic tape scanning unit in which the rotary transformer is mounted very accurately and simply on the drum sections of the scanning unit and the resulting connection is also stable. In accordance with the invention, the supporting elements are constructed as sleeves of a weldable material, which are open at one end and closed at the opposite end which projects from the drum section. The transformer disc is provided with mounting surfaces which register with the closed ends of the sleeves on the drum section and which are constituted by at least one mounting element of a weldable material, and the closed ends of the sleeves are welded to the corresponding mounting surfaces. In this way a transformer disc can first be positioned correctly relative to a drum section, after which it is welded to said drum section, so that tolerances can be eliminated and a high accuracy is attainable. Further the process of making such an assembly is easy to control during manufacture and the resulting assembly is not affected by varying operating conditions and aging. Welding may be effected by means of any known welding technique.

Assembly is simplified if the mounting surfaces are formed by an annular mounting element arranged on the transformer disc. In this way only one part has to be secured to the transformer disc, for example by means of an adhesive.

It is also found to be advantageous if each mounting surface is formed by a separate disc-shaped mounting element arranged on the transformer disc. This enables the positions of the individual mounting elements to be chosen in conformity with the desired arrangement of the sleeves on the drum section.

The sleeves may be mounted on the drum section in several ways. For example, the sleeves may be pressed into or cemented in the bores in the drum section or they may be soldered or welded to the drum section. It is found to be very advantageous if the sleeves comprise collars at their one ends and are inserted loosely into the bores in the drum section, so that the collars rest on one side of the drum section, and at the locations where the sleeves project from the drum section the sleeves are formed with circumferential ridges, which bear against the other side of the drum section to secure the sleeves to the drum section. In this way the sleeves are mounted on the drum section in a very stable manner without the use of additional means. Further, as the circumferential ridges are formed, it is possible to compensate for differences in heights of the sleeves which project from the drum section, so that an even more accurate mounting of the transformer disc on the drum section is possible.

The circumferential ridge may be formed in a variety of ways. For example the entire portion of the sleeve which projects from the drum section may be deformed to become mushroom-shaped, so that it is urged against the radial drum surface. This is possible if the sleeve has a uniformly and comparatively thin wall and its closed end portion is semispherical. However, it is found to be particularly advantageous if in comparison with the other wall-portions the circumferential walls of the portions of the sleeves which project from the drum section are thickened towards the interior. This ensures that the circumferential ridge is formed only on that portion of the sleeve which directly adjoins the drum section and that the deformed material fits tightly against the radial surface of the drum section and thus firmly secures the sleeve to the drum section. Such a deformation can readily be carried out and is highly reproducible during manufacture.

The invention also relates to a method of manufacture whereby a transformer disc of a two-part rotary transformer may be assembled on a drum section of a drum-shaped scanning unit. As stated above, a known method of such assembly employs adhesives for this purpose, but this is found to be laborious and difficult to control during manufacture. Adhesive joints are often subject to change due to aging and varying operation conditions.

A method in accordance with the invention is characterized in that (a) at least three sleeves of weldable material which are open at one end and closed at the other end are mounted in angularly spaced axially parallel bores in the drum section in such a way that the closed ends of the sleeves project from that side of the drum section on which the transformer disc is to be mounted, (b) the transformer disc is provided with at least one mounting element of a weldable material to form mounting surfaces corresponding to the closed ends of the sleeves on the drum section, (c) the drum section and the transformer disc are placed in a jig in which the closed ends of the sleeves are situated opposite and are spaced from the corresponding mounting surfaces on the transformer disc, and (d) the closed ends of the sleeves are welded to the mounting surfaces by means of laser beams which are projected into the sleeves through their open ends. This results in a simple process which is particularly suitable for the assembly-line manufacture of large quantities of scanning units. Moreover, the laser-welding process provides reliable and stable welds in a simple manner and owing to the use of the narrow laser beams no problems occur even if the sleeves have relatively small dimensions. Moreover, central welds are formed, which have a particularly low shrinkage, which is very important in view of the desired high accuracy with which a transformer disc should be mounted on a drum section.

In accordance with a further feature of a method in accordance with the invention, which is found to be very advantageous, after steps (a) and (b) have been carried out the transformer disc is placed in a measuring device to measure the heights, relative to a reference plane, of the individual mounting surfaces corresponding to the closed ends of the sleeves in the drum section, and the drum section is placed in a device in which the individual sleeves projecting from the drum section are deformed to a nominal height relative to a reference plane, which nominal height has been adapted to the measured height of the corresponding mounting surface on the transformer disc. Steps (c) and (d) are then carried out. In this way a transformer disc can be mounted very accurately on a drum section, so that the two transformer discs of a rotary transformer can be arranged at a very small distance opposite each other with their major disc surfaces, which ensures a very good signal transfer. Moreover, this ensures that the distances between the closed ends of the sleeves and the associated mounting surfaces on the transformer disc are always equal, so that by welding the closed ends to the mounting surfaces very stable and reproducible joints are obtained. Moreover, the individual steps of such a method can be fully automated.

BRIEF DESCRIPTION OF THE DRAWINGS

An embodiment of a magnetic tape scanning unit in accordance with the invention and a preferred method of assembly thereof will now be described in more detail, by way of example, with reference to the accompanying drawings in which.

DESCRIPTION OF THE PREFERRED EMBODIMENTS

Figure 1:
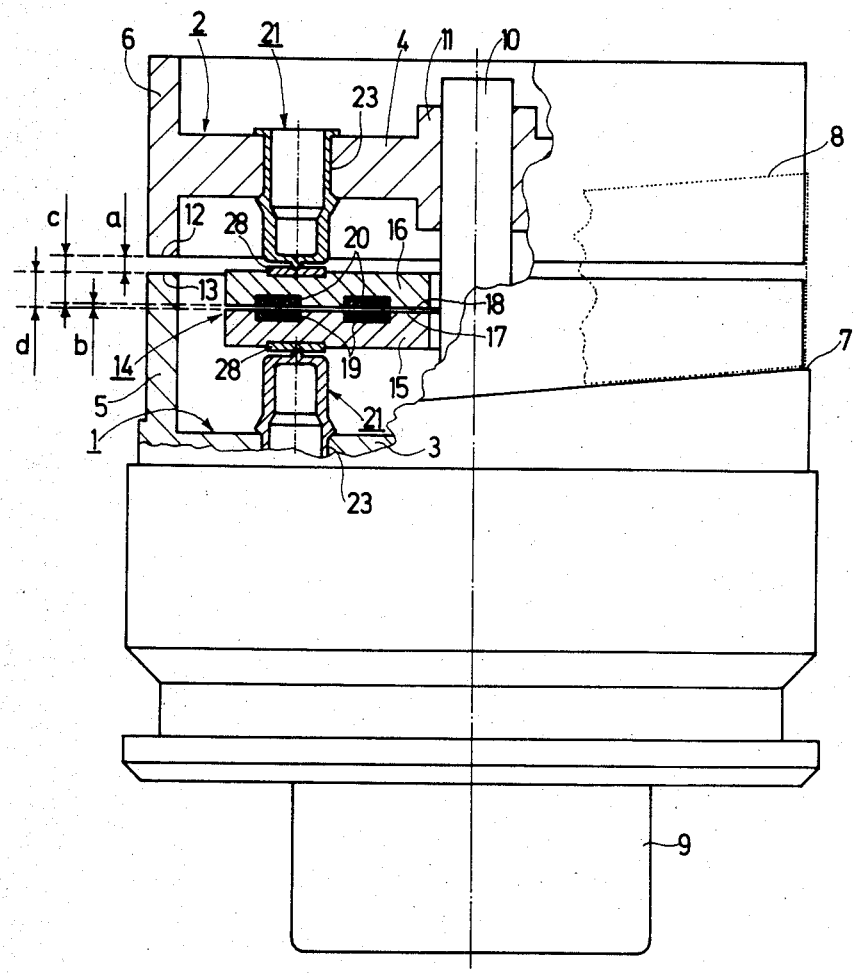
FIG. 1 is a partly sectional view of a magnetic tape scanning unit in which the two transformer discs of a rotary transformer are mounted on two drum sections of the scanning unit by means of sleeves.

FIG. 1 shows a drum-shaped scanning unit for recording and/or reproducing video signals on/from a magnetic record-carrier tape, which unit comprises a stationary drum section 1 and a rotatable drum section 2 which is coaxial therewith. Drum sections 1 and 2 comprise a central disc-shaped web 3 and 4, respectively, which adjoins a circumferential cylindrical wall 5 and 6, respectively, the circumferential wall surfaces of the two drum sections together constituting the circumferential surface of the scanning unit and around which a record carrier tape can be wrapped along a helical path at a predetermined angle. The tape runs partly at the circumferential surface of the stationary drum section 1 and partly over that of the rotatable drum section 2, a stepped portion 7 on the drum section 1 ensuring that both edges of the record carrier are guided exactly. In FIG. 1 a part of such a tape 8 is shown schematically by dotted lines.

A motor 9 is mounted on the stationary drum section 1 and has a drive shaft 10 on which the drum section 2 is mounted with its hub 11, so that it can be rotated by the motor 9. The position of the drum section 2 on the shaft 10 is such that the bounding surface 12 of the drum wall 6 which faces the drum section 1 is situated at a distance a from the bounding surface 13 of the drum wall 5 of the drum section 1, so that between the two drum sections 1 and 2 a gap is formed which has a width, for example, of the order of magnitude of 0.1 mm. This gap allows scanning elements, for example magnetic heads, not shown, which are arranged on the rotatable drum section 2, to cooperate with a record carrier 8, thereby scanning the record carrier along contiguous oblique tracks to record or reproduce signals.

For applying the signals to be recorded to the scanning elements which rotate with the drum section 2 and for taking off the signals reproduced by the scanning elements during reproduction, and also for transferring other control signals to the rotating drum section 2, there is provided a two-part rotary transformer 14 which comprises two transformer discs 15 and 16 of a ferrite material. The transformer disc 15 is connected to the drum section 1 and the transformer disc 16 to the drum section 2, the drive shaft 10 of the motor 9 extending through central openings in the two transformer discs 15 and 16. The transformer discs 15 and 16 are each arranged in such a way that two of their major disc surfaces 17 and 18 are situated at a distance b opposite each other. The two transformer discs 15 and 16 have annular grooves in their facing surfaces to accommodate transformer windings, the facing transformer windings cooperating with each other for the transfer of signals. In the present example it has been assumed that, for example, two signals should be transferred. In order to ensure that the signals are transferred with a high efficiency by means of such a rotary transformer 14 the distance b between the two major disc surfaces 17 and 18 of the two drum sections 15 and 16 should be minimal, for example of the order of magnitude of 0.05 mm or preferably even smaller. However, this means that the transformer discs should be mounted on the drum sections with a maximal accuracy in order to ensure that the desired small distance between the two major disc surfaces 17 and 18 of the two drum sections 15 and 16 is obtained after the two drum sections have been assembled to form the scanning unit, which must also be effected with a maximal accuracy. The transformer discs should be mounted on the drum sections in a very stable manner in order to ensure that during operation the position of the two transformer discs relative to each other is maintained and, consequently, the small distance between the major disc surfaces 17 and 18 cannot change to an impermissible extent.

Figure 2:
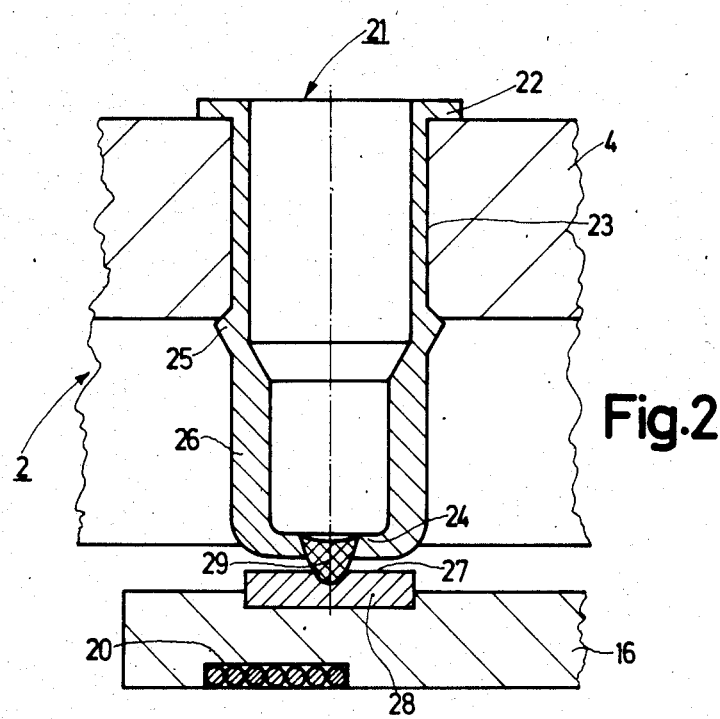
FIG. 2 is a sectional view to a large scale, showing one of the points where a transformer disc is secured to a drum section of a unit as shown in FIG. 1.

How a transformer disc is mounted on a drum section in accordance with the invention will be described hereinafter for the transformer disc 16 and the drum section 2. The transformer disc 15 can be mounted on the drum section 1 in a similar way, but it is not strictly necessary to mount the two transformer discs on the associated drum sections in the same way. The transformer disc 16 is mounted on the drum sections 2 by means of four supporting elements 21, of which one is shown in FIG. 1, which elements are angularly spaced on the drum section 2. Each element 21, see also FIG. 2, is constructed as an annular cylindrical sleeve of a weldable material and is open at one end and closed at the other end. At its open end each such element or sleeve 21 has a collar 22. The sleeves are inserted into angularly spaced axially parallel bores 23 in the drum section 2 in such a way that their collars 22 rest on one side of the drum section and their closed ends 24 project from that side of the drum section 2 where the transformer disc 16 is to be mounted. The sleeves 21 thus mounted in the drum section are formed with a circumferential ridge 25 at the location where they project from the drum section, which ridge bears against that side of the drum section which is remote from the collar 22. When the collar 22 is in the correct position such a ridge is formed by exerting pressure on the sleeve from the closed end 24. In this way each of the sleeves 21 is clamped in the drum section 2 by the cooperation of its collar 22 and its ridge 25 with this drum section. At the location of the portion 26 which projects from the drum section the circumferential wall of each sleeve 21 is thickened at the inside in comparison with the remainder of this wall, which ensures that the ridge 25 is formed only at the location where the sleeve directly adjoins the drum section and that the deformed material fits tightly against the radial surface of the drum section and thereby firmly secures the sleeve to the drum section. The cooperation with the ridges 25 can be improved further by bevelling the relevant edges of the bores 23.

The transformer disc 16 is provided with mounting surfaces 27 which correspond to the closed ends 24 of the sleeves 21 and which in the present embodiment are each formed by a mounting element 28 of a weldable material arranged on the transformer disc; in the present example the mounting elements 28 are disc-shaped but they may also be cup-shaped. These mounting elements may be secured to the transformer disc by means of an adhesive or in another manner, for example by embedding them in the ferrite material of the transformer disc during sintering.

By means of a jig in which the transformer disc 16 provided with the mounting elements 28 and the drum section 2 provided with the sleeves 21 may be placed, the transformer disc and the drum section can be brought into the desired position relative to each other, in which the mounting surfaces 27 of the elements 28 are disposed correctly opposite the closed ends 24 of the sleeves 21. In this position of the transformer disc 16 relative to the drum section 2 the closed ends 24 of the sleeves 21 are welded to the mounting surfaces 27 of the mounting elements 28, as is indicated by the weld 29 in FIG. 2. Such a welding operation, for which any known welding method may be employed, for example electrical resistance welding, results in reliable and stable welds between the closed ends 24 of the sleeves 21 and the mounting elements 28, so that the transformer disc 16 is secured to the drum section 2 exactly in the correct position.

Figure 3:
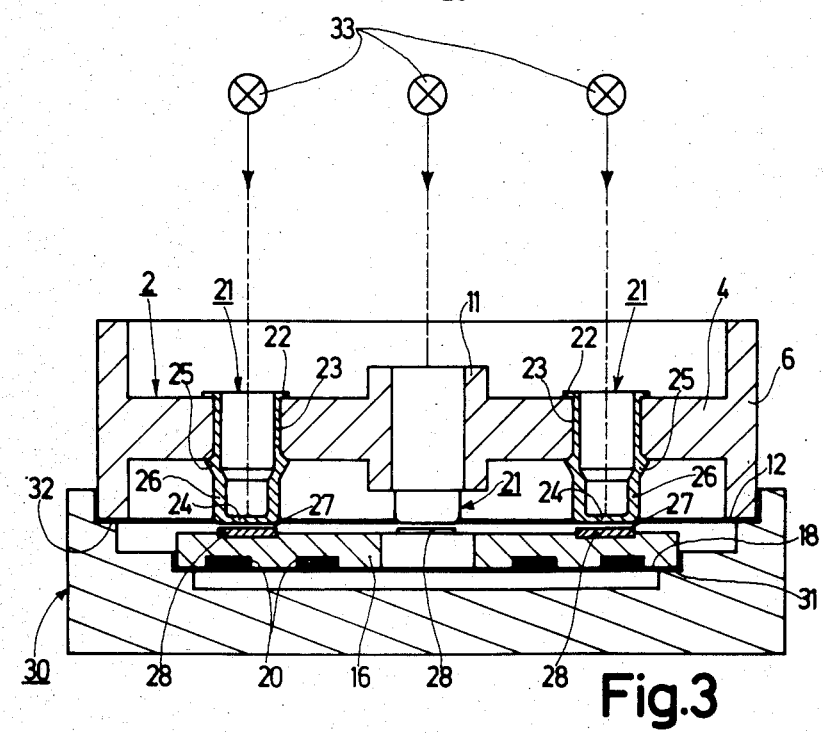
FIG. 3 shows how a transformer disc and a drum section may be placed in a jig in which they are positioned relative to each other and in which they are secured together by laser-beam welding.

It is found to be very advantageous if the transformer disc 16 with the mounting elements 28 and the drum section 2 with the sleeves 21 are assembled in a jig which is constructed in such a way that the closed ends 24 of the sleeves 21 are situated opposite and are spaced from the corresponding mounting surfaces 27 of the mounting elements 28 on the transformer disc 16, after which the closed ends 24 of the sleeves 21 are welded to the mounting surfaces 27 of the elements 28 by means of laser beams which are projected into the sleeves through their open ends. FIG. 3 schematically shows such a jig 30. The jig is disc-shaped and comprises a first step 32 for positioning the drum section 2, the transformer disc 16 and the drum section being positioned in the jig in such a way that the mounting surfaces 27 of elements 28 on the transformer disc are positioned opposite the closed ends 24 of the sleeves 21 on the drum section. In the jig 30, which also defines the correct coaxial position of the transformer disc relative to the drum section, the steps 31 and 32 are situated at such a level relative to each other that the mounting surfaces 27 and the closed ends 24 are spaced from each other. As a result of this, the position of the transformer disc and the drum section relative to each other can be defined very accurately, because this eliminates possible axial tolerances. The schematically shown laser-beam sources 33 then project laser beams into the sleeves, through the open ends, which beams impinge on the bottoms 24 of the sleeves and thereby weld the closed ends 24 to the mounting faces 27 of the mounting elements 28, so that the gaps between them are bridged, as is shown in FIG. 2. Suitably, the closed ends 24 of all the sleeves 21 are welded to the associated mounting surfaces 27 of the elements 28 at the same time, so that the desired position of the transformer disc 16 relative to the drum section 2 is maintained accurately and no stresses are produced. The clearances between the closed ends 24 of the sleeves 21 and the mounting surfaces 27 of the elements 28 depend inter alia on the materials to be welded to each other and the thickness of the end walls 24 of the sleeves 21 and may range between some thousandths and some tenths of millimeters. Suitable materials for the sleeves 21 and the mounting elements 28 are copper-nickel alloys, but the two parts need not necessarily be made of the same material. It has been found that the welds formed by means of laser beams are particulary reliable and stable, the shrinkage during welding being minimal because the welds are situated in the centres of the closed ends of the sleeves, which is also important in order to obtain the required high accuracy. Thus, the manner in which the welds are made ensures a very accurate position of the transformer disc 16 relative to the drum section 2.

Figure 4:
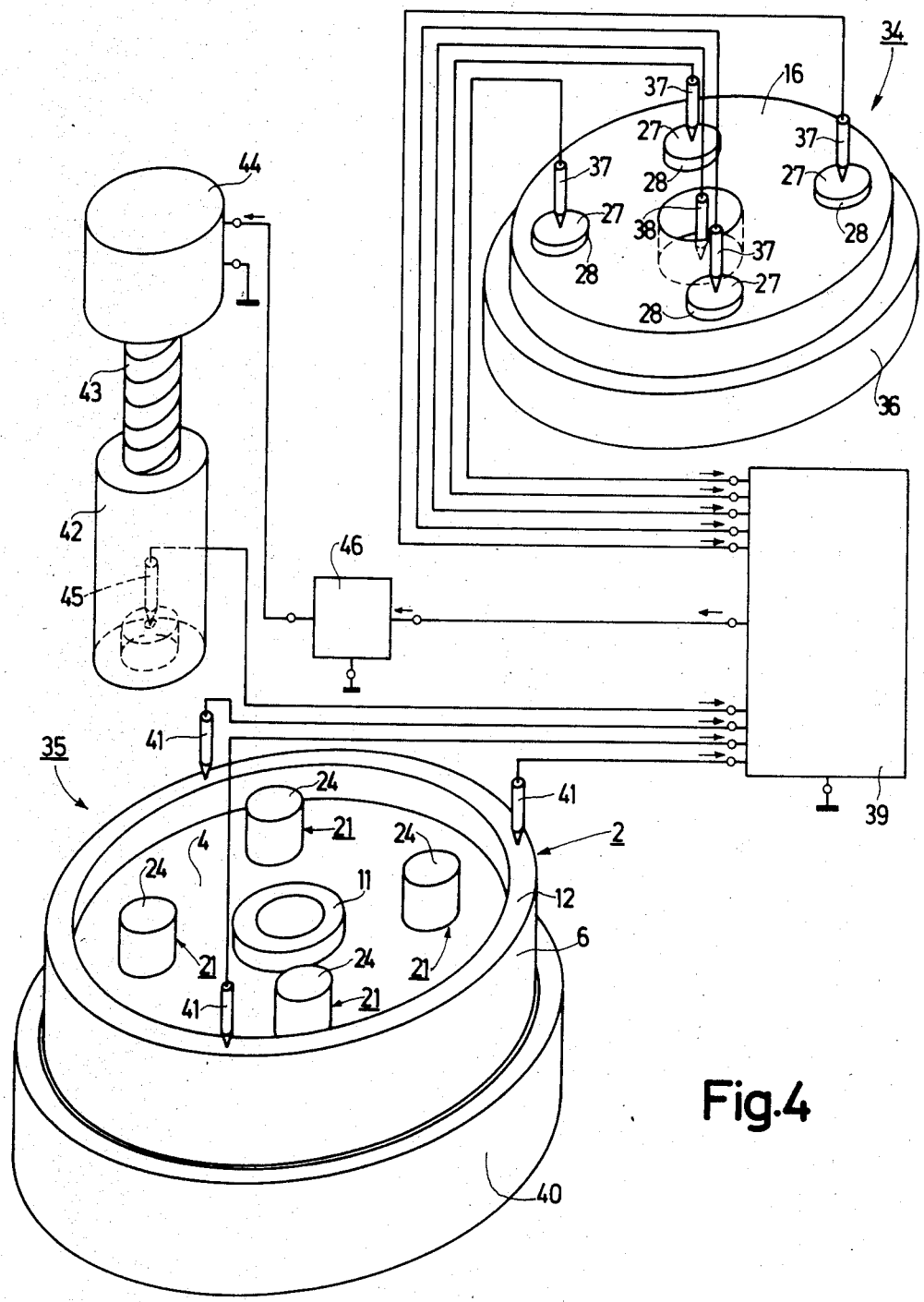
FIG. 4 shows schematically how the heights of the mounting surfaces on a transformer disc are measured and the sleeves on a drum section are deformed to a nominal dimension which has been adapted to these measured heights by computation.

Such a method of mounting a transformer disc on a drum section can be improved even further with respect to the attainable accuracy of the position of the two parts relative to each other, as will be described with reference to FIG. 4. For this purpose the transformer disc 16 with the mounting elements 28 is placed in a measuring device 34 in which the height of each of the mounting surfaces 27 of the four elements 28 relative to a reference plane is measured. Similarly, the drum section 2 with the sleeves 21 is placed in a device 35 in which the portion of each of the sleeves 21 which project from said drum section is deformed to a nominal height relative to a reference plane, which nominal height has been adapted to the measured height of the corresponding mounting surfaces 27 on the transformer disc 16. In this way the heights of the individual sleeves are adapted to the heights of the associated mounting surfaces on the transformer disc. If the transformer disc 16 and the drum section 2 are now placed in a device 30 as shown in FIG. 3, in which each mounting surface 28 is situated opposite a sleeve 21 whose height has been adapted to this mounting surface 27, it is guaranteed that the distances between the closed ends 24 of the individual sleeves 21 and the associated mounting surfaces 27 of the elements 28 are always equal, so that the subsequent welding operations by means of laser beams can proceed without any problems and the position of the transformer disc relative to the drum section is very accurate.

The measuring device 34 comprises a disc-shaped support 36 on which the transformer disc 16 is placed with its major disc surface which is remote from the mounting elements 28. Four measuring sensors 37 are each arranged on one of the mounting surfaces 27 of the four elements 28. A further measuring sensor 38 is placed on the support 36 through the central opening in the transformer disc 16. The support 36 and hence the major disc surface define the reference level which is determined by means of the sensor 38 and relative to which the heights of the individual mounting surfaces 27 are determined by the other four sensors 37. The sensors, which may be for example of the inductive type, produce electrical output signals which are applied to a computer 39 which computes the individual heights and stores the relevant values.

The device 35 comprises a support 40 which is formed with supporting elements, not shown, which correspond to the sleeves 21 on the drum section 2 and on which the drum section 2 is placed in such a way that the collars of the sleeves 21 are positioned on them and supported by them. In this position of the drum section 2 the closed ends 24 of the sleeves 21 and the surface 12 of the drum wall 6 are freely accessible. The surface 12 of the drum wall 6 is used as the reference plane relative to which the sleeves 21 are shortened. This reference plane is determined by means of three measuring sensors 41 which are angularly spaced on the surface 12 of the drum wall 6. The measuring sensors 4, also supply electrical output signals via transducers and are also applied to the computer 39. The sleeves 21 may be shortened by means of a plunger 42 which has an axial cylindrical bore in which one of the sleeves 21 is engageable, which plunger can be driven by a motor 44 via a lead-screw 43 in such a way that its height position relative to the drum section 2 changes to deform the relevant sleeve 21 accordingly. Inside the plunger 42 a further measuring sensor 45 is arranged, which cooperates with the end surface 24 of the relevant sleeve 21 and via a transducer supplies an electrical signal which is applied to the computer 39. By combining the signals from the sensor 41 and the sensor 45 the computer 39 determines the instantaneous height of the end surface 24 of the sleeve 21 relative to the reference plane defined by the surface 12 of the drum wall 6. The computer 39 relates this value to the stored height of the mounting surface 27 on the transformer disc 16 associated with this sleeve 21 to compute the length over which the sleeve 21 should be deformed to obtain the desired nominal dimension. The computer 39 transfers the result of this computation to a control circuit 46 which energizes the motor 44 accordingly, so that the plunger 42 is driven accordingly via the lead screw. In this way a control loop is formed between the sensor 45 and the motor 44, which loop ensures that the sleeve is shortened accurately to the nominal dimension determined by the computer. This nominal dimension is the distance c in FIG. 1. Between the major disc surface 18 of the transformer disc 16 and the surface 12 of the drum wall 6 of the drum section 2, taking into account the instantaneous height of the relevant mounting surface 27 relative to the major disc surface 18 of the transformer disc 16 and the desired clearance between the mounting surface 27 and the end surface 24 of the sleeve 21 on the drum section 2, which clearance should be equal for all the four mounting surfaces 27 and sleeves 21. The procedure is the same for other sleeves. By means of the computer 39 these steps can be carried out fully automatically.

The method described above guarantees that the transformer disc 16 is mounted on the drum section 2 in such a way that its major disc surface 18 has exactly a predetermined clearance c relative to the surface 12 of the drum wall 6 of the drum section 2. The transformer disc 15 can be mounted on the drum section 1 in a similar manner, the sleeves on this drum section being shortened relative to a reference plane which is defined by the surface 13 of the drum wall 5 of the drum section 1, which guarantees that the major disc surface 17 of the transformer disc 15 has exactly a clearance d, see FIG. 1, relative to the surface 13 of the drum wall 5 of the drum section 1. This ensures that during mounting of the drum section 2 on the drive shaft 10 a gap a is formed between the two surfaces 12 and 13 of the two drum sections 2 and 1, so that exactly a clearance b is obtained between the two major disc surfaces 17 and 18 of the two transformer discs 15 and 16 of the rotary transformer 14. Owing to the high accuracies attainable by means of the above method the clearances b are attainable between the two major disc surfaces, (clearances b of the order of magnitude of 0.015 mm.) which provides a highly efficient signal transfer by means of the rotary transformer.

As will be apparent from the foregoing, several modifications of the embodiments described in the foregoing are possible within the scope of the invention. This applies in particular to the construction of the sleeves and the manner in which they are mounted on a drum section and to the construction of the mounting surfaces on a transformer disc, the welding process used, and the manner in which the mounting process is carried out. It is obvious that the steps in accordance with the invention may also be applied to other scanning units, for example those comprising two stationary drum sections between which a flat rotatable disc carrying the scanning elements is interposed.

What is claimed is:

1. A drum-shaped magnetic tape scanning unit around whose circumferential surface a record-carrier tape can be wrapped at a predetermined angle, such scanning unit comprising: a stationary drum section and a rotatable drum section coaxial therewith, one end of each drum section facing one end of the other drum section; and a two-part rotary transformer comprising two planar transformer discs of ferrite material, each disc carrying at least one transformer winding; the discs being arranged coaxially on the facing ends of the rotatable drum section and the stationary drum section, respectively, so that a surface of each disc faces and is spaced from a surface of the other disc; at least one of the drum sections having at least three angularly spaced parallel bores therein holding respective supporting elements for supporting the transformer disc on such drum section, characterized in that:

said supporting elements are in the form of cylindrical sleeves of weldable material which are open at one end and closed at the other end, the closed end of each sleeve projecting from the end of said at least one of the drum sections which faces the end of the other drum section;

the transformer disc on said at least one of the drum sections has planar mounting elements thereon, a surface of respective ones of said mounting elements being coaxial with and facing the closed end of respective ones of the sleeves held by said at least one of the drum sections, such mounting elements being of a weldable material; and the closed end of each of said sleeves is welded to the surface of the mounting element facing such closed end.

2. A scanning unit as claimed in claim 1, characterized in that said sleeves have collars at the open ends thereof which bear against the end of said at least one of the drum sections opposite the end thereof which faces the other drum section, and where the closed ends of the sleeves project from the opposite end of said at least one of the drum sections they are formed with circumferential ridges which bear against that end of such drum section, whereby the sleeves are securely held in such drum section.

3. A scanning unit as claimed in claim 2, characterized in that the circumferential wall of each sleeve is thickened toward the interior of such sleeve beginning where such sleeve projects from the end of said at least one drum sections which faces the other drum section.

4. An improved method useful in the manufacture of a drum-shaped magnetic tape scanning unit around whose circumferential surface a record-carrier tape can be wrapped at a predetermined angle, such scanning unit comprising: a stationary drum section and a rotatable drum section coaxial therewith, one end of each drum section facing one end of the other drum section; and a two-part rotary transformer comprising two planar transformer discs of ferrite material, each disc having at least one transformer winding on one surface thereof and at least three angularly spaced mounting elements on the other surface thereof, the discs being arranged coaxially on the facing ends of the rotatable drum section and the stationary drum section, respectively, so that each transformer winding on each disc faces and is spaced from a transformer winding on the other disc; at least one of the drum sections having at least three angularly spaced parallel bores therein holding respective cylindrical sleeves of weldable material which are open at one end and closed at the other end, the closed end of each sleeve projecting from the end of said at least one of the drum sections facing the end of the other drum section; the planar mounting elements on the transformer disc on said at least one of the drum sections being coaxial with and facing the closed ends of respective ones of the sleeves held by said at least one of the drum sections, such mounting elements being of a weldable material;

said method comprising the following steps for affixing the closed ends of the sleeves held by said at least one of the drum sections to the surfaces of the transformer disc mounting elements facing such closed ends:

(a) placing said at least one of said drum sections and the transformer disc to be affixed thereto in a jig which situates the closed ends of said sleeves facing and spaced from the surfaces of the mounting elements on such transformer disc, and (b) welding the closed ends of the sleeves to the facing surfaces of the mounting elements by axially projecting laser beams through the open ends of the sleeves.

5. A method as claimed in claim 4, further comprising, prior to step (a) thereof, placing the transformer disc in a measuring device which measures the height, relative to a reference plane, of the surface of each of the mounting elements thereon; placing said at least one of said drum sections in a device wherein the sleeves projecting therefrom are deformed so as to reduce the nominal height of the closed end of each sleeve relative to a reference plane, and setting the nominal height of the closed end of each sleeve in accordance with the measured height of the surface of the mounting element to which it is to be welded.

* * * * *